(12) United States Patent
Bronicki

(10) Patent No.: US 6,526,754 B1
(45) Date of Patent: *Mar. 4, 2003

(54) COMBINED CYCLE POWER PLANT

(75) Inventor: Lucien Y. Bronicki, Yavne (IL)

(73) Assignee: Ormat Industries Ltd., Yavne (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,185

(22) Filed: Nov. 10, 1998

(51) Int. Cl.[7] ............................................. F01K 25/00
(52) U.S. Cl. .............................. 60/671; 60/676; 60/682
(58) Field of Search .......................... 60/651, 653, 670, 60/671, 676, 682, 39.5

(56) References Cited

U.S. PATENT DOCUMENTS

| | | | | |
|---|---|---|---|---|
| 4,063,420 A | * | 12/1977 | Sloyan ........................ | 60/671 |
| 4,363,638 A | * | 12/1982 | Mariani ...................... | 48/111 |
| 4,570,077 A | * | 2/1986 | Lambley .................... | 60/618 X |
| 5,632,143 A | * | 5/1997 | Fisher et al. .............. | 60/39.5 X |
| 5,634,339 A | * | 6/1997 | Lewis et al. .............. | 60/682 X |
| 5,687,570 A | * | 11/1997 | Bronicki et al. ........... | 60/682 X |
| 5,708,306 A | * | 1/1998 | Lambley .................... | 60/618 X |
| 5,799,490 A | * | 9/1998 | Bronicki et al. ........... | 60/682 X |

FOREIGN PATENT DOCUMENTS

| | | |
|---|---|---|
| IL | 108559 | 6/1992 |
| IL | 71331 | 11/1997 |

OTHER PUBLICATIONS

Davis, Thomas P. and Shelor, F. Mack, "Diesel Combined Cycles Using Fired Boilers," Power–Gen Americas Conference, Dec. 1994.

\* cited by examiner

Primary Examiner—Hoang Nguyen
(74) Attorney, Agent, or Firm—Nath & Associates PLLC; Gary M. Nath; Jerald L. Meyer

(57) ABSTRACT

A combined cycle power plant includes a gasifier for converting biomass material, low grade coal, etc., to combustible gases and producing heat, an internal combustion engine coupled to a generator for burning the combustible gases and driving said generator which produces power. The internal combustion engine rejects heat and produces hot exhaust gases. A vaporizer containing an organic fluid is responsive to the hot exhaust gases for vaporizing the organic fluid and producing vaporized organic fluid which is supplied to an organic vapor turbine coupled to a generator. The turbine expands the vaporized organic fluid driving the generator and producing expanded vaporized organic fluid which is condensed in a condenser. The condensate produced by the condenser is returned to the vaporizer. At least some of the heat rejected by the internal combustion engine is transferred the condensate.

68 Claims, 1 Drawing Sheet

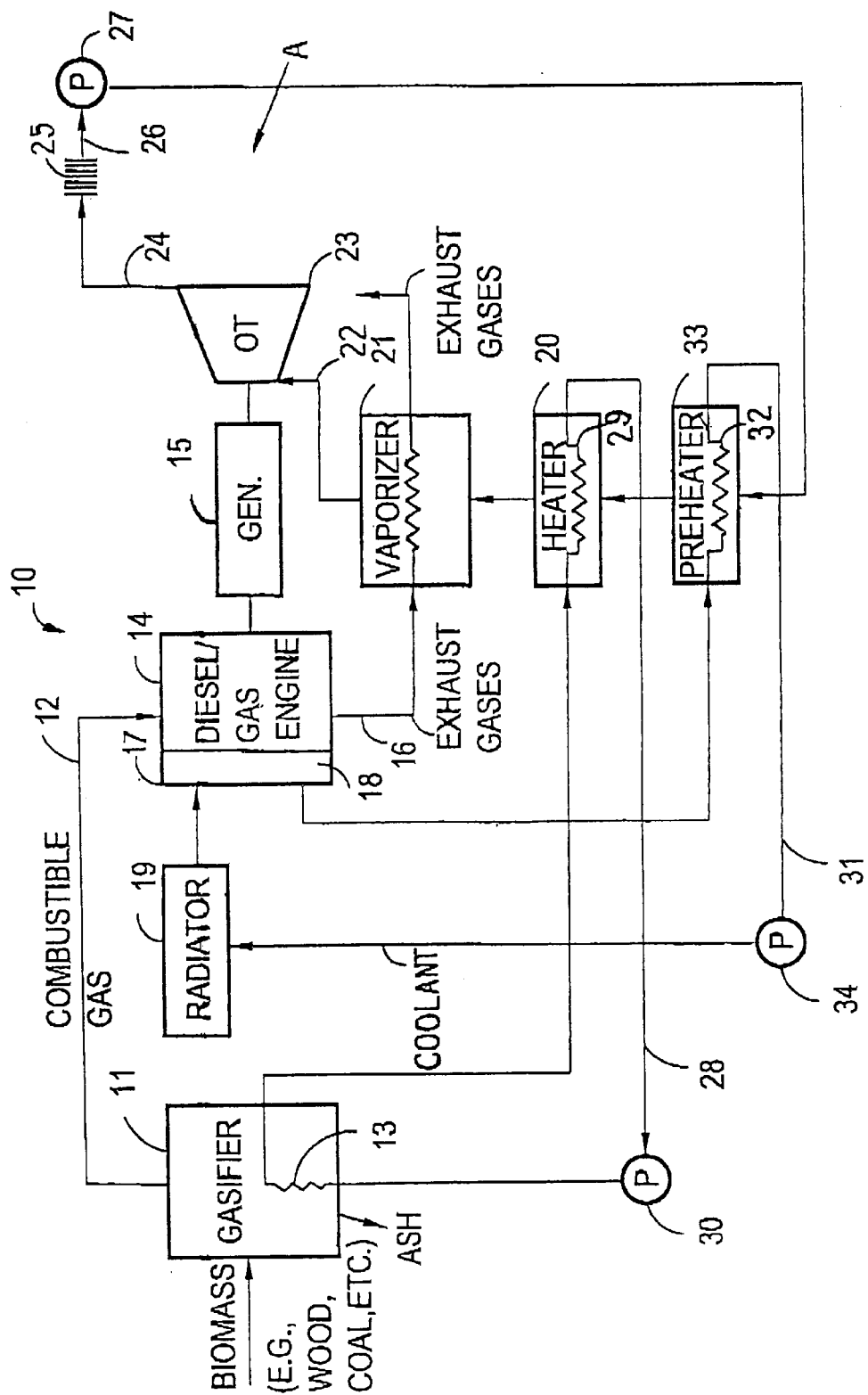

COMBINED CYCLE POWER PLANT

1. Technical Field

This invention relates to a combined cycle power plant, and more particularly to a combined cycle power plant that utilizes a biomass gasifier that supplies fuel to an internal combustion engine.

2. Background of the Invention

A combined cycle power plant is described in a paper entitled "Diesel Combined Cycles Using Fired Boilers", by T. P. Davis, and F. M. Shelor presented at the Power-Gen Americas conference in Orlando, Fla. on Dec. 7–9, 1994. Such power plant includes a prime-mover diesel engine generator combined with a boiler having specially designed burners supplied with the diesel exhaust for producing steam, and a Rankine cycle steam turbine. Both the diesel and the burners are supplied with natural gas or light distillate oil. And, since up to 20% of the total fuel input heat to a diesel is rejected to engine coolant, this low level heat (less than 200° F.) is available to preheat feed water in the steam cycle.

When only low quality fuels such as biomass fuels, e.g., sawdust, are available, however, the only practical utilization of such fuels is by way of gasification. In such case, it has been suggested to generate power by fueling diesel generators with the combustible gas produced by the gasifier utilizing the diesel exhaust as a heat source for an unfired heat recovery steam generator. Because of the high efficiency of present diesels, however, exhaust temperatures are relatively low. As a result, energy recovery from the exhaust is low, and the steam quality produced is less than ideal for energy production.

It is therefore an object of the present invention to provide a new and improved combined cycle power plant operating with biomass fuels which has performance characteristics superior to those known in the prior art.

SUMMARY OF THE INVENTION

A combined cycle power plant according to the present invention includes a gasifier for converting biomass material, or low grade coal, etc., to combustible gases and producing heat, and an internal combustion engine coupled to a generator for burning the combustible gases and driving the generator which produces power. The internal combustion engine rejects heat and produces hot exhaust gases. A vaporizer, which is a part of a power cycle turbine unit, containing a working fluid, preferably, an organic fluid is responsive to the hot exhaust gases for vaporizing the organic fluid and producing vaporized organic fluid which is supplied to an organic vapor turbine preferably coupled to a generator. The turbine expands the vaporized organic fluid driving the generator thus producing power and expanded vaporized organic fluid which is condensed in a condenser. The condensate produced by the condenser is returned to the vaporizer. At least some of the heat produced by the gasifier is transferred to the organic fluid in the vaporizer. Preferably, at least some of the heat rejected by the internal combustion engine is transferred the organic fluid in a preheater interposed between the condenser and the vaporizer.

BRIEF DESCRIPTION OF THE DRAWINGS

An embodiment of the invention is described by way of example, and with reference to the accompanying drawing.

DETAILED DESCRIPTION

Referring now to the drawing, reference numeral 10 designates a combined cycle power plant according to the present invention. Power plant 10 includes biomass, or low grade coal, etc., generator 11 shown in the form of a gasifier that converts low quality materials, e.g., wood, low grade coal, etc., to combustible gas producing sensible heat in the temperature range of about 650° F. Fuel, e.g., wood, low grade coal, etc., is added to the gasifier which produces combustible gases in line 12, and internal heat that is extracted to a heat transfer fluid, such as oil, water, etc., in coils 13 in the gasifier.

Power plant 10 also includes an internal combustion engine, preferably diesel/gas engine 14 coupled to generator 15. The combustible gas in line 12 provides fuel for engine 14 which drives generator 15 supplying power to a system (not shown), and produces hot exhaust gases in exhaust line 16. Coolant jacket 17 associated with the engine contains coolant 18 which receives heat rejected by the engine, and radiator 19 is connected to jacket 17 by a coolant line.

The hot exhaust gases in line 16 pass through vaporizer 21 which is part of power cycle turbine unit A preferably containing an organic fluid such as pentane for example. Vaporizer 21 is thus responsive to the hot exhaust gases from engine 14 for vaporizing the organic fluid and producing vaporized organic fluid in line 22. Organic vapor turbine 23, preferably coupled to generator 15, expands the vaporized organic fluid in line 22 producing expanded vaporized organic fluid in turbine exhaust line 24, and driving generator 15. Condenser 25, shown as being air-cooled, condenses the expanded vaporized organic fluid from line 24 producing organic fluid condensate in line 26. This condensate is returned to vaporizer 21 by cycle pump 27.

In accordance with this invention, at least some of the heat produced by gasifier 11 is transferred to the condensate by way of the heat transfer fluid in coil 13. Specifically, the heat transfer fluid is in closed loop 28, the operation of pump 30 serving to circulate the heat transfer fluid between coil 13 in the gasifier and coil 29 in heater 20 downstream of vaporizer 21. Thus, the heat transfer fluid in loop 28 serves as means for transferring at least some of the heat produced by gasifier 11 to the organic fluid condensate.

The present invention also provides means for transferring at least some of the heat rejected by engine 14 to the organic fluid condensate. This is accomplished by coolant in coolant loop 31 which connects radiator 19 to coolant jacket 17 and coil 32 in preheater 33 interposed between condenser 25 and vaporizer 21 and upstream of heater 20. Pump 34 in coolant loop 31 serves to circulate the coolant. While the above description discloses the use of an organic fluid as the working fluid for power cycle turbine unit A, other working fluids such as water, etc., can also be used.

It is believed that the advantages and improved results furnished by the apparatus of the present invention are apparent from the foregoing description of the invention. Various changes and modifications may be made without departing from the spirit and scope of the invention as described in the claims that follow.

What is claimed is:

1. A combined cycle power plant comprising:
   a) a gasifier for converting biomass material to combustible gases and producing heat;
   b) an internal combustion engine for burning said combustible gases, said internal combustion engine rejecting heat and producing hot exhaust gases;
   c) a vaporizer containing an organic fluid and responsive to said hot exhaust gases for vaporizing said organic fluid and producing vaporized organic fluid;
   d) an organic vapor turbine for expanding said vaporized organic fluid and producing expanded vaporized organic fluid;

e) a condenser for condensing said expanded vaporized organic fluid and producing organic fluid condensate; and f) a pump that returns said organic fluid condensate to said vaporizer.

2. A combined cycle power plant according to claim 1 including means for transferring at least some of the heat rejected by said internal combustion engine to said condensate.

3. A combined cycle power plant according to claim 1 including means for transferring at least some of the heat produced by said gasifier to said condensate.

4. A combined cycle power plant according to claim 2 including a preheater interposed between said condenser and said vaporizer, and said means for transferring heat rejected by said internal combustion engine transfers heat to said preheater thereby preheating said condensate before it is returned to said vaporizer.

5. A combined cycle power plant according to claim 4 wherein said means for transferring heat includes a coolant jacket associated with said internal combustion engine and containing coolant which receives heat rejected by the internal combustion engine, and a radiator connected to said jacket, and means connecting said radiator to said preheater and said coolant jacket to said radiator for effecting coolant flow between said internal combustion engine and said preheater.

6. A combined cycle power plant according to claim 3 including a heat exchanger associated with said gasifier, heat transfer fluid operatively associated with said heat exchanger, and means for exchanging said heat transfer fluid between said heat exchanger and a heater for heating said condensate.

7. A combined cycle power plant according to claim 2 wherein said condenser is air-cooled.

8. A combined cycle power plant according to claim 2 including means for transferring at least some of the heat produced by said gasifier to said condensate.

9. A combined cycle power plant according to claim 8 including a preheater interposed between said condenser and said vaporizer, and said means for transferring heat rejected by said internal combustion engine transfers heat to said preheater thereby preheating said condensate before it is returned to said vaporizer.

10. A combined cycle power plant according to claim 9 wherein said means for transferring heat includes a coolant jacket associated with said internal combustion engine and containing coolant which receives heat rejected by the internal combustion engine, and a radiator connected to said jacket, and means connecting said radiator to said preheater and said coolant jacket to said radiator for effecting coolant flow between said internal combustion engine and said preheater.

11. A combined cycle power plant according to claim 10 including a heat exchanger associated with said gasifier, heat transfer fluid operatively associated with said heat exchanger, and means for exchanging said heat transfer fluid between said heat exchanger and a heater for heating said condensate.

12. A combined cycle power plant according to claim 1 including a generator coupled to said internal combustion engine.

13. A combined cycle power plant according to claim 12 wherein said generator is also coupled to said organic vapor turbine.

14. A combined cycle power plant according to claim 13 wherein said generator is interposed between said internal combustion and said organic vapor turbine.

15. A combined cycle power plant according to claim 3 wherein said condenser is air-cooled.

16. A method for producing power using a combined cycle power plant comprising the steps of:

a) converting biomass material to combustible gases and producing heat using a gasifier;

b) burning said combustible gases using an internal combustion engine, said internal combustion engine rejecting heat and producing hot exhaust gases;

c) vaporizing water contained in a vaporizer responsive to said hot exhaust gases and producing steam;

d) expanding said steam in a steam turbine and producing expanded steam;

e) condensing said expanded steam in a steam condenser and producing steam condensate; and f) returning said steam condensate to said vaporizer using a pump.

17. A method according to claim 16 including transferring at least some of the heat rejected by said internal combustion engine to said steam condensate.

18. A method according to claim 16 including transferring at least some of the heat produced by said gasifier to said steam condensate.

19. A method according to claim 17 including preheating said steam condensate using a preheater interposed between said condenser and said vaporizer and using heat transferred from heat rejected by said internal combustion engine to preheat said steam condensate before it is returned to said vaporizer.

20. A method according to claim 19 including effecting coolant flow from a coolant jacket having coolant that receives heat rejected by the internal combustion engine to said preheater to preheat said steam condensate before it is returned to said vaporizer.

21. A method according to claim 18 including heating said steam condensate in a heater using a heat transfer fluid operatively associated with a heat exchanger associated with said gasifier.

22. A method according to claim 17 including cooling said steam condensate using air.

23. A method according to claim 17 including transferring at least some of the heat produced by said gasifier to said steam condensate.

24. A method according to claim 23 including preheating said steam condensate using a preheater interposed between said condenser and said vaporizer and using heat transferred from heat rejected by said internal combustion engine to preheat said steam condensate before it is returned to said vaporizer.

25. A method according to claim 24 including effecting coolant flow from a coolant jacket having coolant that receives heat rejected by the internal combustion engine to said preheater to preheat said steam condensate before it is returned to said vaporizer.

26. A method according to claim 25 including heating said steam condensate in a heater using a heat transfer fluid operatively associated with a heat exchanger associated with said gasifier.

27. A method according to claim 16 including coupling a generator to said internal combustion engine.

28. A method according to claim 27 including coupling said generator to said steam turbine.

29. A method according to claim 28 including interposing said generator between said internal combustion engine and said steam turbine.

30. A method according to claim 18 including cooling said steam condenser using air.

31. A combined cycle power plant comprising:
a) a gasifier for converting biomass material to combustible gases and producing heat;
b) an internal combustion engine for burning said combustible gases, said internal combustion engine rejecting heat and producing hot exhaust gases;
c) a vaporizer containing an organic fluid and producing vaporized organic fluid;
d) an organic vapor turbine for expanding said vaporized organic fluid and producing expanded vaporized organic fluid;
e) a condenser for condensing said expanded vaporized organic fluid and producing organic fluid condensate;
f) a pump that returns said organic fluid condensate to said vaporizer; and
g) wherein at least some of the heat produced by said gasifier is transferred to said condensate.

32. A combined cycle power plant according to claim 31 wherein said vaporizer containing an organic fluid is responsive to said hot exhaust gases for vaporizing said organic fluid and producing said vaporized organic fluid.

33. A combined cycle power plant according to claim 31 including means for transferring at least some of the heat rejected by said internal combustion engine to said condensate.

34. A combined cycle power plant according to claim 33 including a preheater interposed between said condenser and said vaporizer, and said means for transferring heat rejected by said internal combustion engine transfers heat to said preheater thereby preheating said condensate before it is returned to said vaporizer.

35. A combined cycle power plant according to claim 33 wherein said means for transferring heat includes a coolant jacket associated with said internal combustion engine and contains coolant which receives heat rejected by the internal combustion engine, and a radiator connected to said jacket, and means for connecting said radiator to said preheater and said coolant jacket to said radiator for effecting coolant flow between said internal combustion engine and said preheater.

36. A combined cycle power plant according to claim 31 including a heat exchanger associated with said gasifier, heat transfer fluid operatively associated with said heat exchanger, and means for exchanging said heat transfer fluid between said heat exchanger and a heater for heating said condensate.

37. A combined cycle power plant according to claim 31 including a generator coupled to said internal combustion engine.

38. A combined cycle power plant according to claim 37 wherein said generator is also coupled to said organic vapor turbine.

39. A combined cycle power plant according to claim 38 wherein said generator is interposed between said internal combustion engine and said organic vapor turbine.

40. A method for producing power using a combined cycle power plant comprising the steps of:
a) converting biomass material to combustible gases and producing heat using a gasifier;
b) burning said combustible gases using an internal combustion engine, said internal combustion engine rejecting heat and producing hot exhaust gases;
c) vaporizing water contained in a vaporizer and producing steam;
d) expanding said steam in a steam turbine and producing expanded steam;
e) condensing said expanded steam in a steam condenser and producing steam condensate;
f) returning said steam condensate to said vaporizer using a pump; and
g) transferring at least some of the heat produced by said gasifier to said steam condensate.

41. A method according to claim 40 wherein the step of vaporizing water contained in a vaporizer and producing steam is carried out using said hot exhaust gases.

42. A method according to claim 40 including transferring at least some of the heat rejected by said internal combustion engine to said steam condensate.

43. A method according to claim 40 including preheating said steam condensate using a preheater interposed between said condenser and said vaporizer and using heat transferred from heat rejected by said internal combustion engine to preheat said steam condensate before it is returned to said vaporizer.

44. A method according to claim 43 including effecting coolant flow from a coolant jacket having coolant that receives heat rejected by said internal combustion engine to said preheater to preheat said steam condensate before it is returned to said vaporizer.

45. A method according to claim 40 including heating said steam condensate in a heater using a heat transfer fluid operatively associated with a heat exchanger associated with said gasifier.

46. A method according to claim 40 including coupling a generator to said internal combustion engine.

47. A method according to claim 46 including coupling said generator to said steam turbine.

48. A method according to claim 47 including interposing said generator between said internal combustion engine and said steam turbine.

49. A method according to claim 40 including cooling said steam condenser using air.

50. A combined cycle power plant comprising:
a) a gasifier for converting biomass material to combustible gases and producing heat;
b) an internal combustion engine for burning fuel, said internal combustion engine rejecting heat and producing hot exhaust gases;
c) a vaporizer containing an organic fluid and producing vaporized organic fluid;
d) an organic vapor turbine for expanding said vaporized organic fluid and producing expanded vaporized organic fluid;
e) a condenser for condensing said expanded vaporized organic fluid and producing organic fluid condensate;
f) a pump that returns said organic fluid condensate to said vaporizer;
g) wherein at least some of the heat produced by said gasifier is transferred to said condensate; and
h) wherein at least some of the heat rejected by said internal combustion engine is transferred to said condensate.

51. A combined cycle power plant according to claim 50 wherein said vaporizer containing an organic fluid is responsive to said hot exhaust gases for vaporizing said organic fluid and producing said vaporized organic fluid.

52. A combined cycle power plant according to claim 50 wherein said fuel burned in said internal combustion engine is comprised of said combustible gases.

53. A combined cycle power plant according to claim 52 including a preheater interposed between said condenser and said vaporizer, and said means for transferring heat rejected by said internal combustion engine transfers heat to said preheater thereby preheating said condensate before it is returned to said vaporizer.

54. A combined cycle power plant according to claim 52 wherein said means for transferring heat includes a coolant jacket associated with said internal combustion engine and contains coolant which receives heat rejected by the internal combustion engine, and a radiator connected to said jacket, and means for connecting said radiator to said preheater and said coolant jacket to said radiator for effecting coolant flow between said internal combustion engine and said preheater.

55. A combined cycle power plant according to claim 50 including a heat exchanger associated with said gasifier, heat transfer fluid operatively associated with said heat exchanger, and means for exchanging said heat transfer fluid between said heat exchanger and a heater for heating said condensate.

56. A combined cycle power plant according to claim 50 including a generator coupled to said internal combustion engine.

57. A combined cycle power plant according to claim 56 wherein said generator is also coupled to said organic vapor turbine.

58. A combined cycle power plant according to claim 57 wherein said generator is interposed between said internal combustion engine and said organic vapor turbine.

59. A method for producing power using a combined cycle power plant comprising the steps of:
  a) converting biomass material to combustible gases and producing heat using a gasifier;
  b) operating an internal combustion engine, said internal combustion engine rejecting heat and producing hot exhaust gases;
  c) vaporizing water contained in a vaporizer and producing steam;
  d) expanding said steam in a steam turbine and producing expanded steam;
  e) condensing said expanded steam in a steam condenser and producing steam condensate;
  f) returning said steam condensate to said vaporizer using a pump;
  g) transferring at least some of the heat produced by said gasifier to said steam condensate; and
  h) transferring at least some of the heat rejected by said internal combustion engine to said steam condensate.

60. A method according to claim 59 wherein the step of vaporizing water contained in a vaporizer and producing steam is carried out using said hot exhaust gases.

61. A method according to claim 59 including supplying said combustible gases to said internal combustion engine for combustion therein.

62. A method according to claim 59 including preheating said steam condensate using a preheater interposed between said condenser and said vaporizer and using heat transferred from heat rejected by said internal combustion engine to preheat said steam condensate before it is returned to said vaporizer.

63. A method according to claim 62 including effecting coolant flow from a coolant jacket having coolant that receives heat rejected by said internal combustion engine to said preheater to preheat said steam condensate before it is returned to said vaporizer.

64. A method according to claim 59 including heating said steam condensate in a heater using heat transfer fluid operatively associated with a heat exchanger associated with said gasifier.

65. A method according to claim 60 including coupling a generator to said internal combustion engine.

66. A method according to claim 65 including coupling said generator to said steam turbine.

67. A method according to claim 66 including interposing said generator between said internal combustion engine and said steam turbine.

68. A method according to claim 59 including cooling said steam condensate using air.

* * * * *